United States Patent
Ogihara

(10) Patent No.: US 9,511,532 B2
(45) Date of Patent: Dec. 6, 2016

(54) BLOW-MOLDING METHOD FOR CONTAINER WITH HANDLE AND BLOW-MOLDING EQUIPMENT

(75) Inventor: Shuichi Ogihara, Komoro (JP)

(73) Assignee: NISSEI ASB MACHINE CO., LTD, Nagano (JP)

( * ) Notice: Subject to any disclaimer, the term of this patent is extended or adjusted under 35 U.S.C. 154(b) by 0 days.

(21) Appl. No.: 14/187,154

(22) PCT Filed: Aug. 20, 2012

(86) PCT No.: PCT/JP2012/070964
§ 371 (c)(1),
(2), (4) Date: Feb. 21, 2014

(87) PCT Pub. No.: WO2013/027692
PCT Pub. Date: Feb. 28, 2013

(65) Prior Publication Data
US 2014/0225315 A1    Aug. 14, 2014

(30) Foreign Application Priority Data
Aug. 22, 2011   (JP) ................. 2011-180369

(51) Int. Cl.
| | | |
|---|---|---|
| *B29C 49/20* | (2006.01) | |
| *B29C 49/42* | (2006.01) | |
| *B29L 31/00* | (2006.01) | |
| *B29C 49/06* | (2006.01) | |
| *B29C 49/10* | (2006.01) | |
| *B29C 49/28* | (2006.01) | |

(52) U.S. Cl.
CPC .......... *B29C 49/20* (2013.01); *B29C 49/4205* (2013.01); *B29C 49/06* (2013.01); *B29C 49/10* (2013.01); *B29C 49/28* (2013.01); *B29C 2049/2017* (2013.01); *B29C 2049/2039* (2013.01); *B29C 2049/2082* (2013.01); *B29C 2049/4221* (2013.01); *B29L 2031/7158* (2013.01)

(58) Field of Classification Search
None
See application file for complete search history.

(56) References Cited

U.S. PATENT DOCUMENTS

| | | | |
|---|---|---|---|
| 4,952,133 A | 8/1990 | Hasegawa et al. | |
| 5,167,970 A | 12/1992 | Yoshimo et al. | |
| 6,444,158 B1 * | 9/2002 | Grob et al. | 264/516 |

FOREIGN PATENT DOCUMENTS

| | | |
|---|---|---|
| JP | 04-039023 | 10/1992 |
| JP | 6-28896 B2 | 4/1994 |
| JP | 7-205997 | 8/1995 |
| JP | 8-282789 A | 10/1996 |
| JP | 9-85811 A | 3/1997 |
| JP | 11-70569 A | 3/1999 |
| JP | 3599851 B2 | 9/2004 |
| JP | 2006-130755 A | 5/2006 |
| WO | WO-0107233 A1 | 2/2001 |

* cited by examiner

*Primary Examiner* — Monica Huson
(74) *Attorney, Agent, or Firm* — David L. Hoffman; Hoffman Patent Group

(57) ABSTRACT

A blow molding device and a blow molding method are disclosed that can blow-mold a container with a handle without requiring a handle inserter that inserts a handle into a blow molding section. A blow molding method for blow-molding a container with a handle includes heating a preform (2) that is held by a heating transfer jig (370), transferring the preform from the heating transfer jig to a blow transfer jig (420), and transferring the blow transfer jig in a state in which a handle (500) is held by the blow transfer jig to be adjacent to the preform in a transfer direction.

13 Claims, 8 Drawing Sheets

BLOW-MOLDING METHOD FOR CONTAINER WITH HANDLE AND BLOW-MOLDING EQUIPMENT

This application is a U.S. national stage application of International Patent Application No. PCT/JP2012/070964, having an international filing date of Aug. 20, 2012, which designated the United States and which claims priority from Japanese Patent Application No. 2011-180369, filed on Aug. 22, 2011, the entirety of both of which are incorporated herein by reference.

TECHNICAL FIELD

The present invention relates to a blow molding method and a blow molding device for blow-molding a container with a handle.

BACKGROUND ART

A container produced by blow-molding a synthetic resin (e.g., polyethylene terephthalate) may be integrated with a handle in order to improve the handling capability. The handle is integrated with the container when blow-molding the container. The handle is transferred by a handle inserter to a pair of blow cavity molds that are opened in a blow molding section, and then clamped (see Patent Documents 1 and 2).

RELATED-ART DOCUMENT

Patent Document

Patent Document 1: Japanese Patent No. 3599851
Patent Document 2: JP-B-6-28896

SUMMARY OF THE INVENTION

Technical Problem

Since a known handle inserter transfers the handle to the blow molding section independently of the preform, it is necessary to adjust the transfer position of the handle. In this case, when the width (i.e., the width in the preform transfer direction) of a pair of blow cavity molds increases along with an increase in the number of preforms simultaneously subjected to blow molding, the length of the cantilever arm of the handle inserter increases, and it is unstable. Moreover, the blow molding cycle time may increase as a result of transferring the handle to a pair blow cavity molds using the handle inserter.

Several aspects of the invention may provide a blow molding device and a blow molding method that can blow-mold a container with a handle without requiring a handle inserter that inserts a handle into a blow molding section.

Solution to Problem (1) According to one aspect of the invention, there is provided a blow molding method for blow-molding a container with a handle that includes disposing a preform and the handle between a pair of blow cavity molds, and blow-molding the preform into the container to integrate the handle with the container, the blow molding method comprising:
heating the preform in a state in which the preform is held by a heating transfer jig; and
supplying the handle to the heating transfer jig after completion of the heating so that the handle is held by the heating transfer jig between two preforms that are adjacent to each other in a transfer direction.

According to one aspect of the invention, since the handle is transferred in a state in which the handle is held by the heating transfer jig at a position adjacent to the preform in the transfer direction, it is unnecessary to separately provide a handle inserter that inserts the handle into the blow molding section. Moreover, the preform and the handle can be transferred together without unnecessarily heating the handle.

(2) The blow molding method may further comprise:
transferring the preform and the handle simultaneously from the heating transfer jigs to a blow transfer jig.

In a blow molding device that heats the preform before blow molding, the preform may be transferred using the heating transfer jig, and transferred to the blow transfer jig before blow molding taking account of the difference in pitch, for example. According to one aspect of the invention, the preform and the handle can be simultaneously transferred from the heating transfer jigs to the blow transfer jig, and then transferred to the blow molding section.

(3) In the blow molding method,
the heating transfer jigs may transfer the preform and the handle in an inverted state,
the blow transfer jig may transfer the preform and the handle in an upright state, and
the blow molding method may further comprise inverting the preform and the handle before transferring the preform and the handle from the heating transfer jigs to the blow transfer jig.

When the preform is transferred in the inverted state using the heating transfer jig, the heating transfer jig may have a simple structure in which a pin is inserted into the opening of the preform. The handle is also transferred in the inverted state to have a constant relative positional relationship with the preform. Since the preform is set to the upright state during blow molding, the preform and the handle are inverted.

(4) In the blow molding method,
the pair of blow cavity molds may have n (n is a natural number) cavities for blow-molding a container with a handle in an area in which 2n or 3n cavities for blow-molding 2n or 3n containers without a handle are provided, and
n containers with a handle may be blow-molded using n blow core molds among 2n or 3n blow core molds provided to mold 2n or 3n containers without a handle.

Since a container with a handle is larger than a container without a handle, the number of preforms simultaneously subjected to blow molding containers with a handle is halved or reduced to provide a molding space. Therefore, existing equipment can be used without significantly modifying the blow molding section.

(5) In the blow molding method,
a relative positional relationship between the preform and the handle held by the heating transfer jigs may be identical with a relative positional relationship between the preform and the handle during blow molding.

The above configuration makes it possible to perform blow molding without changing the relative positional relationship between the preform and the handle held by the heating transfer jigs, and makes it unnecessary to provide a mechanism for adjusting the positional relationship between the preform and the handle. Moreover, the position of the parting line that occurs in the container due to blow molding becomes uniform, and a process that improves the moldability of the container with a handle is facilitated.

(6) The blow molding method may further comprise:
transferring the preform and the handle held by the blow transfer jigs to a space between the pair of blow cavity molds in an open state;
clamping the pair of blow cavity molds to position the preform and the handle inside the pair of blow cavity molds; and
blow-molding the preform into the container inside the pair of blow cavity molds to integrate the handle with the container.

According to one aspect of the invention, since the preform and the handle held by the blow transfer jig are transferred to the space between the pair of blow cavity molds in an open state, it is unnecessary to separately provide a handle inserter that inserts the handle into the blow molding section. Since the positional relationship between the preform and the handle can be uniquely determined by the blow transfer jig, position adjustment can be made unnecessary. Moreover, since the preform and the handle can be simultaneously transferred to the blow molding section, an increase in blow molding cycle time does not occur.

(7) According to another aspect of the invention, there is provided a blow molding device that is configured to dispose a preform and a handle between a pair of blow cavity molds, and blow-mold the preform into a container to integrate the handle with the container, the blow molding device comprising:
a heating section that heats the preform that is transferred while being held by a heating transfer jig; and
a handle supply section that supplies the handle to the heating transfer jig after completion of the heating by the heating section so that the handle is held by the heating transfer jig between two preforms that are adjacent to each other in a transfer direction.

According to the above configuration, the preform and the handle can be transferred together without unnecessarily heating the handle. This makes it unnecessary to separately provide a handle inserter that inserts a plurality of handles (corresponding to the number of preforms simultaneously subjected to blow molding) at the same time into the narrow space between a pair of blow cavity molds using a cantilever arm.

(8) In the blow molding device,
the heating transfer jig that holds the preform may include a first holding section that holds an open neck of the preform in an inverted state in which the neck is positioned on a lower side,
the heating transfer jig that holds the handle may include a second holding section that holds the handle so that the handle is arranged in one direction, and
the first holding section and the second holding section may be removable from the heating transfer jigs.

The above configuration makes it possible to mold a container with a handle by adding the handle supply section to a blow molding device that molds a container without a handle, and replacing the first holding section of some of the heating transfer jigs with the second holding section.

DESCRIPTION OF EMBODIMENTS

Exemplary embodiments of the invention are described in detail below with reference to a comparative example. Note that the following exemplary embodiments do not in any way limit the scope of the invention defined by the claims laid out herein. Note also that all of the elements described below in connection with the following exemplary embodiments should not necessarily be considered to be the essential elements of the invention.

1. Method for Blow-Molding Container with Handle

Figure 1:
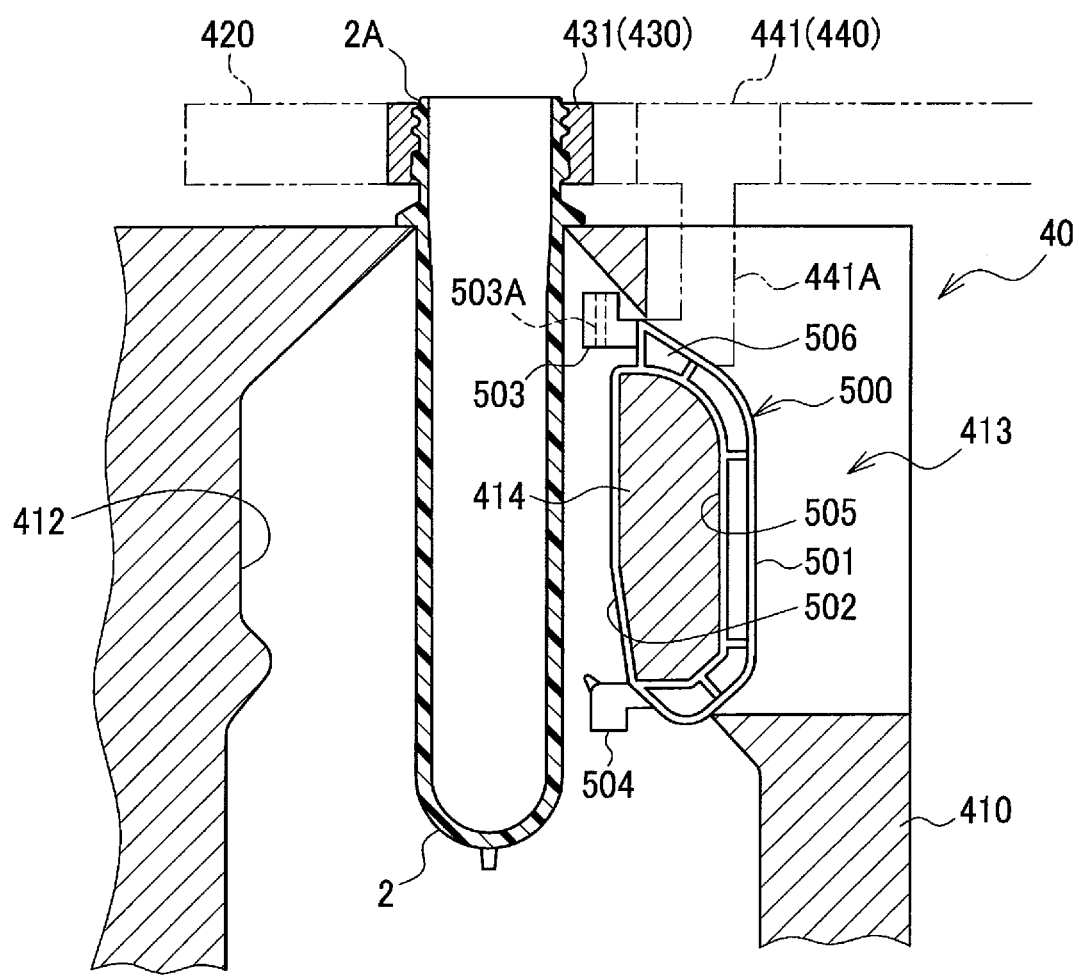
FIG. 1 is a view illustrating a blow molding step that blow-molds a container with a handle.
Figure 2:
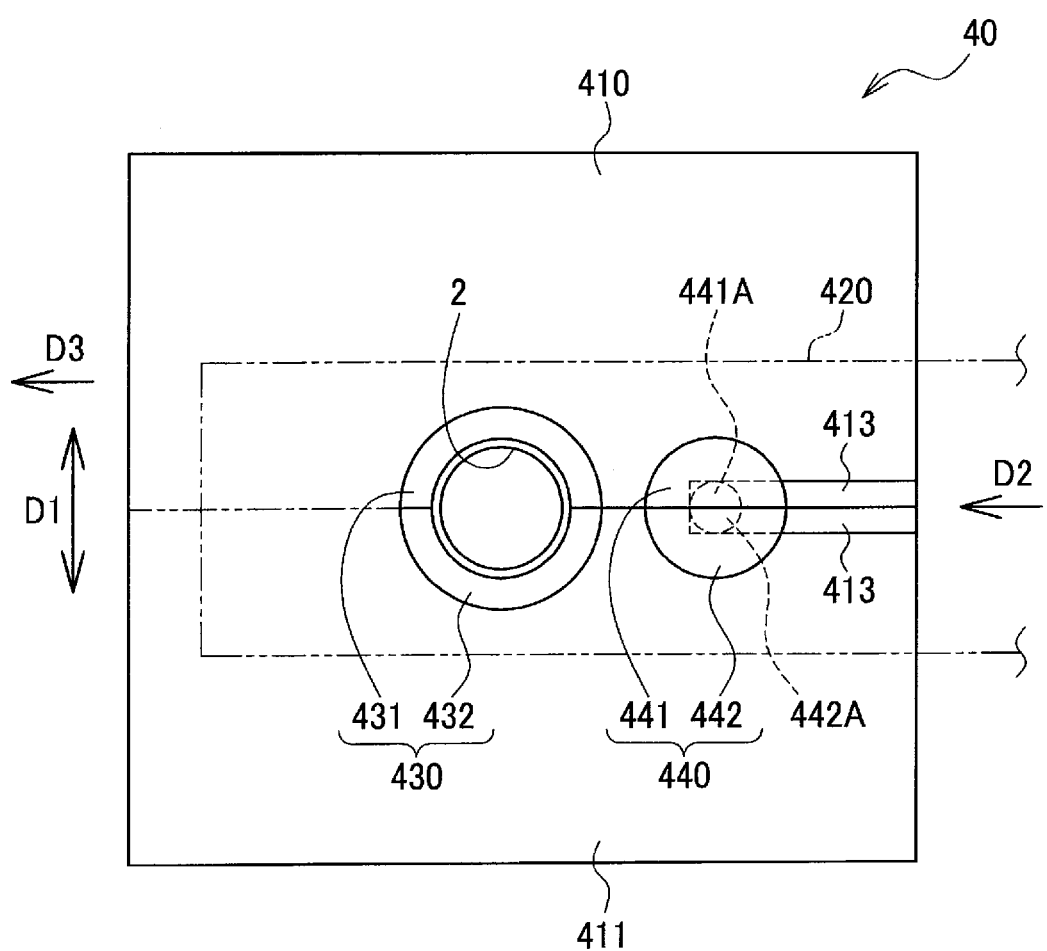
FIG. 2 is a schematic plan view of FIG. 1.

FIGS. 1 and 2 illustrate a blow molding section 40 in a state in which blow cavity molds 410 and 411 that make a pair are clamped. The blow cavity molds 410 and 411 can be opened (i.e., can be moved away from each other) along the direction D1 illustrated in FIG. 2. Each of the blow cavity molds 410 and 411 (only the blow cavity mold 410 is illustrated in FIG. 1) has a cavity 412 for blow-molding a container with a handle.

A handle 500 is formed in the shape of a ring having a grip 501 and a back side 502 that is opposite to the grip 501, for example. The handle 500 has a configuration in which an upper end securing section 503 is formed to protrude upward from the upper end thereof, and a lower end securing section 504 is formed to protrude downward from the lower end thereof. When a preform 2 is blow-molded into a container while being biaxially stretched, the upper end securing section 503 and the lower end securing section 504 are caught by the wall of the container, and the handle 500 is integrated with the container. Note that the shape of the handle 500 is not limited thereto.

The blow cavity molds 410 and 411 have a handle securing section 414 that is inserted into a ring-shaped hollow section 505 of the handle 500. The blow cavity molds 410 and 411 have a slit 413 in which the grip 501 of the handle 500 is placed.

The preform 2 and the handle 500 are transferred to the blow molding section 40 in a state in which the preform 2 and the handle 500 are held by a carry-in jig 420 (i.e., blow transfer jig). The carry-in jig 420 includes a neck-holding section 430 that holds a neck 2A of the preform 2, and a handle-holding section 440 that holds the handle 500. The neck-holding section 430 includes chuck elements 431 and 432 that make a pair, and can be opened and closed in the direction parallel to the direction D1 (see FIG. 2). The neck 2A of the preform 2 is held between the chuck elements 431 and 432.

Likewise, the handle-holding section 440 includes chuck elements 441 and 442 that make a pair, and can be opened and closed in the direction parallel to the direction D1 (see FIG. 2). The chuck elements 441 and 442 respectively include vertically suspended sections 441A and 442A, and the handle 500 is held between the respective lower ends of the vertically suspended sections 441A and 442A. The handle 500 has a recess 506 that is formed in each side surface, for example. The recesses 506 are held between the respective lower ends of the vertically suspended sections 441A and 442A so that the handle 500 is held between the chuck elements 441 and 442. Since the vertically suspended sections 441A and 442A are disposed within the respective slits 413 of the blow cavity molds 410 and 411, the vertically suspended sections 441A and 442A can hold the handle 500 without interfering with the blow cavity molds 410 and 411 even after the blow cavity molds 410 and 411 have been clamped.

In one embodiment of the invention, the preform 2 and the handle 500 are transferred to the space between the blow cavity molds 410 and 411 in an open state in the direction D2 illustrated in FIG. 2 while being held by the carry-in jig 420 (blow transfer jig). The blow cavity molds 410 and 411 are then closed, and the preform 2 and the handle 500 are positioned inside the blow cavity molds 410 and 411. When the blow cavity molds 410 and 411 have been clamped, and the preform 2 and the handle 500 have been held by the blow cavity molds 410 and 411, the carry-in jig 420 is opened in the direction parallel to the direction D1 (see the double-headed arrow), and moved to the position at which the carry-in jig 420 receives a preform 2 and a handle 500 that are subsequently subjected to blow molding. The preform 2 is blow-molded into a container inside the blow cavity molds 410 and 411 using a blow core mold and a stretching rod, so that the handle 500 is integrated with the container.

The resulting container with a handle is transferred from the blow cavity molds 410 and 411 in an open state while being held by a carry-out jig (not illustrated in the drawings) that is moved in synchronization with the carry-in jig 420. Since the handle is integrated with the container, the carry-out jig holds only the neck of the container, and need not hold the handle. Note that the carry-in jig 420 and the carry-out jig used as the blow transfer jig may be driven using a single drive source.

According to one embodiment of the invention, since the preform 2 and the handle 500 are transferred to the space between the blow cavity molds 410 and 411 in an open state while being held by the carry-in jig 420, it is unnecessary to separately provide a handle inserter that inserts the handle 500 into the blow molding section 40. Moreover, since the positional relationship between the preform 2 and the handle 500 is uniquely determined by the carry-in jig 420, it is unnecessary to provide a mechanism for adjusting the positions of the preform 2 and the handle 500. Since the preform 2 and the handle 500 can be simultaneously transferred to the blow molding section 40, an increase in blow molding cycle time does not occur.

The carry-in jig 420 may change the positions of the preform 2 and the handle 500 or the positional relationship between the preform 2 and the handle 500. For example, the height at which the carry-in jig 420 receives the preform 2 and the handle 500, and transfers the preform 2 and the handle 500 to the blow molding section 40 may differ from the height of the preform 2 and the handle 500 during blow molding. When the preform 2 and the handle 500 are transferred and blow-molded in an upright state in which the neck 2A is positioned on the upper side (see FIG. 1), the carry-in jig 420 that holds the preform 2 and the handle 500 may be moved downward from the carry-in position to the blow molding position. In this case, a mechanism that opens and closes the carry-in jig 420 at the blow molding position in the direction parallel to the direction D1 illustrated in FIG. 1 can easily operate without interfering with the transfer path. When the chuck position of the handle 500 is the same as the position of the neck 2A of the preform 2, the carry-in jig 420 may be provided with a mechanism that moves only the handle 500 downward to the blow molding position for the handle 500.

The carry-in jig 420 can also hold the preform 2 and the handle 500 during blow molding. Therefore, the carry-in jig 420 may also be used as the carry-out jig to transfer the container with a handle from the blow molding section 40 in the direction D3 illustrated in FIG. 2 after the blow cavity molds 410 and 411 have been opened.

2. Injection Stretch Blow Molding Device

A blow molding device (e.g., injection stretch blow molding device) that implements the above blow molding method is described below. When using a hot parison method (1-stage method), the preform 2 that retains heat applied during injection molding need not necessarily be heated, and the handle 500 supplied from the outside can be attached to the carry-in jig 420 when attaching the preform 2 to the carry-in jig 420.

When heating the preform 2 before blow molding in the 1-stage method or a cold parison method (2-stage method), the handle 500 may be inserted into a heating transfer jig that transfers the preform 2 after heating the preform 2. The blow molding device described below is configured so that the handle 500 is inserted into the heating transfer jig that transfers the preform 2. Note that a blow molding device that molds a container without a handle will be first described, and changes made when molding a container with a handle will be described thereafter.

2.1. Outline

Figure 3:
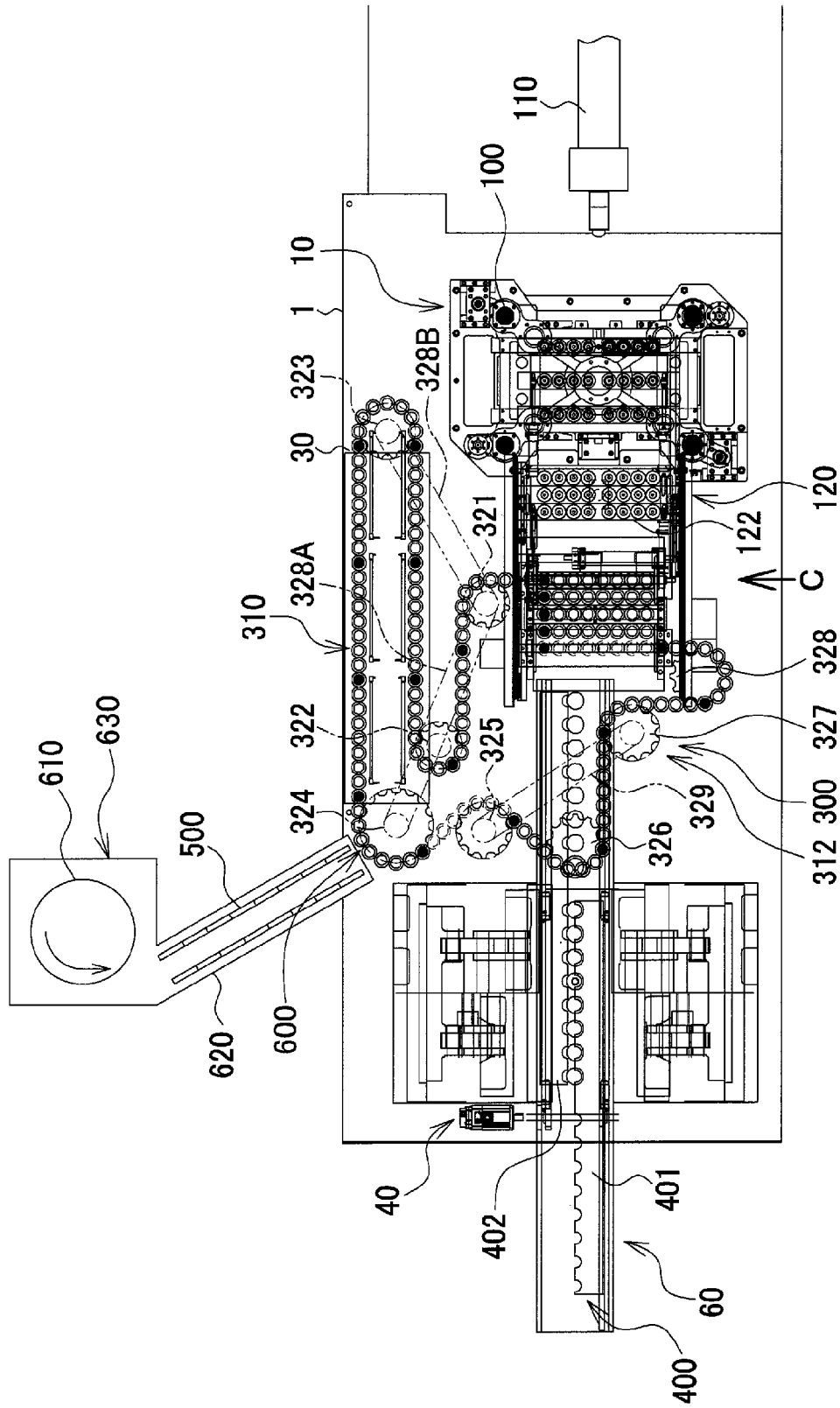
FIG. 3 is a plan view illustrating a blow molding device according to one embodiment of the invention.
Figure 4:
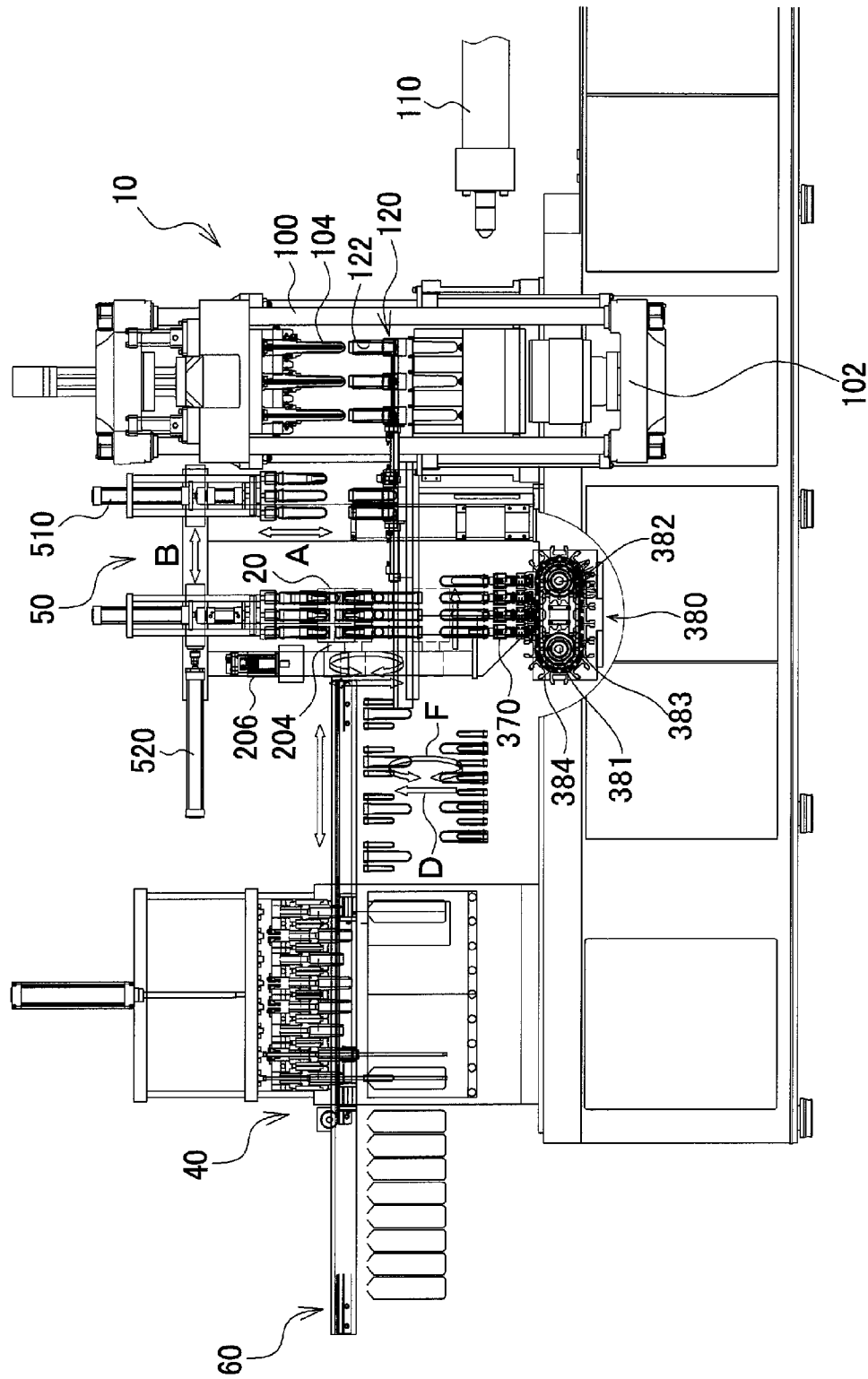
FIG. 4 is a front view illustrating the blow molding device illustrated in FIG. 3.

FIG. 3 is a plan view illustrating an injection stretch blow molding device, and FIG. 4 is a front view illustrating the injection stretch blow molding device. As illustrated in FIGS. 3 and 4, an injection molding section 10, a cooling section 20, a heating section 30, and a blow molding section 40 are provided on a stage 1 of the injection stretch blow molding device. Note that the details of the injection stretch blow molding device illustrated in FIGS. 3 and 4 are the same as those of the injection stretch blow molding device disclosed in Japanese Patent Application No. 2010-238199 (WO2012/057016).

One embodiment of the invention implements a 1.5-stage injection stretch blow molding device that utilizes the 1-stage method in which the injection molding operation and the blow molding operation are implemented in-line, but has the advantage of the 2-stage method in which the number of preforms simultaneously produced by injection molding differs from the number of preforms simultaneously subjected to blow molding.

Specifically, the difference in molding temperature in each operation when 2N preforms simultaneously produced by injection molding are subjected to blow molding in m operations in units of 2n or 3n preforms, is reduced by subjecting the preforms to forced cooling before heating so that the resulting containers have uniform molding quality.

2.2. Injection Molding Section

The injection molding section 10 includes a clamping mechanism 102 that clamps molds along four tie rods 100 illustrated in FIG. 3. The clamping mechanism 102 clamps an injection core mold 104 (see FIG. 4) and an injection cavity mold 106. An injection device 110 brings a nozzle into contact with a hot runner mold, and injects a resin to produce a preform by injection molding.

As illustrated in FIG. 3, the number 2N of preforms simultaneously produced by injection molding in the injection molding section 10 is 24 (3 (rows)×8) at a maximum, for example. When molding a container with a handle, four preforms are produced by injection molding in each row (i.e., N=12). For example, twenty-four (2N=24) injection cavity molds 106 are disposed in the injection molding section 10 when molding a 1.5-liter container, and twelve (N=12) injection cavity molds 106 are disposed in the injection molding section 10 when molding a container with a handle. The injection core mold 104 and the injection cavity mold 106 have a function of subjecting the preform to forced cooling using a refrigerant, and the preform is cooled to a temperature at which the preform can be removed from the injection core mold 104 and the injection cavity mold 106. The cooling section 20 cools the preform in a way differing from the injection core mold 104 and the injection cavity mold 106.

The injection molding section 10 includes a removal device 120 that removes the 2N preforms produced by injection molding. The removal device 120 is configured so that 2N (3 (rows)×8) pots 122 (i.e., holding members) can move horizontally between a receiving position under the injection core mold 104 and a transfer position that is situated outside the space defined by the tie rods 100. The row pitch of the pots 122 is changed from a wide pitch (injection molding pitch) at the receiving position to a narrow pitch at the transfer position during the horizontal movement of the pots 122. Note that two pots among the three pots 122 drawn at the transfer position are pots used for a preform having a large diameter and a large length (i.e., the pots drawn at the receiving position), and the remaining pot among the three pots 122 is a pot used for a preform having a small diameter and a small length. Specifically, the size and the number of pots 122 are changed corresponding to the size of the preform. In FIG. 4, the pots 122 are drawn by the solid line at the receiving position and the transfer position for convenience of explanation. The pots 122 stand still at the receiving position or the transfer position in the actual situation.

The injection molding section 10 that includes the removal device 120 may be implemented in the same manner as that included in the preform molding device disclosed in Japanese Patent No. 4148576, for example. Note that the injection molding section 10 is not limited thereto.

2.3. Cooling Section

The 2N preforms produced by injection molding are transferred to the cooling section 20 that subjects the preforms to forced cooling. As illustrated in FIG. 4, a preform transfer device 50 is provided in order to transfer the preforms. The preform transfer device 50 transfers the 2N preforms held by the pots 122 (3 rows) that are situated at the transfer position (see FIG. 4) to the cooling section 20.

The injection molding section 10 produces the 2N preforms 2 by injection molding in an upright state in which the neck is positioned on the upper side. The cooling section 20 includes an inversion section 200. The inversion section 200 can invert the preforms 2 in the upright state to an inverted state in which the neck is positioned on the lower side. Specifically, the inversion operation can be performed during cooling, and a long cooling time can be provided without separately providing an inversion time and the like.

The cooling section 20 can subject the 2N preforms 2 to forced cooling over a time equal to or longer than the injection molding cycle time required for the injection molding section 10 to produce the 2N preforms 2 by injection molding.

The forced cooling step performed by the cooling section 20 reduces the difference in temperature between the 2N preforms 2 that have been simultaneously produced by injection molding immediately before heating even when the heating start timing is changed. When subjecting the 2N preforms 2 that retain heat applied during injection molding to natural cooling, a significant difference in temperature is observed between the 2N preforms 2 immediately before heating depending on the natural cooling time.

The 1.5-stage injection stretch blow molding device according to one embodiment of the invention subjects the preforms 2 transferred from the injection molding section 10 to forced cooling as described above. Since the preforms 2 need not be cooled to room temperature, and retain heat applied during injection molding, high energy efficiency achieved by a 1-stage device can also be achieved.

2.4. Heating Section

The heating section 30 heats the cooled 2N preforms 2 to an optimum stretch temperature. The heating section 30 heats the 2N preforms 2 in an inverted state in which the neck is positioned on the lower side. The heating section 30 heats the 2N preforms 2 while continuously transferring the 2N preforms 2.

The heating section 30 is disposed along a continuous transfer path 310 that forms part of a transfer path 300 that forms a closed loop or a circulation loop in which (k×2N) preforms 2 (k is an integer equal to or larger than 2) that correspond to k cycles are transferred. The transfer path 300 may include a plurality of sprockets 321 to 328 (see FIG. 3), a plurality of transfer members 330 (see FIG. 5) that can engage the plurality of sprockets 321 to 328, and respectively hold one preform 2, and a guide rail (not illustrated in the drawings) that guides the plurality of transfer members 330 along the transfer direction. The transfer path 300 includes the upstream-side continuous transfer path 310 and a downstream-side intermittent transfer path 312.

Figure 5:
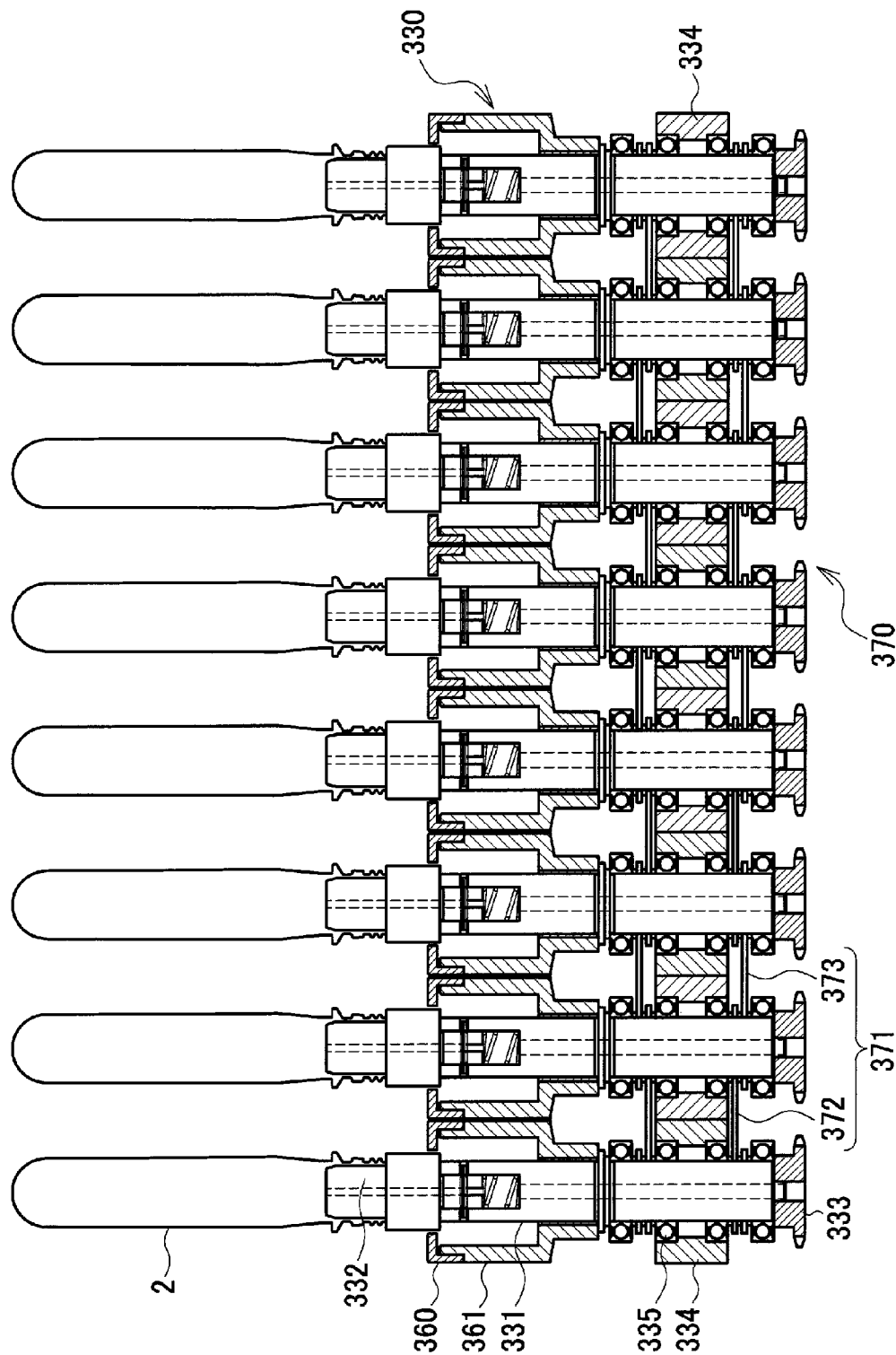
FIG. 5 is a front view illustrating a transfer jig in which 2n transfer members are connected using a connection member.

As illustrated in FIG. 5, the transfer member 330 is configured so that a holding section (first holding section) 332 that is inserted into the neck 2A is removably supported on one end (upper end) of a rotation shaft 331, and a sprocket 333 to which a rotation drive force is applied is secured on the other end (lower end) of the rotation shaft 331. The sprocket 333 engages a stationary or movable chain 350 disposed in the heating section 30 (see FIG. 3), and rotates together with the rotation shaft 331. The heating section 30 may have a known configuration in which a heater and a mirror are disposed on each side of the continuous transfer path 310. A variation in temperature does not occur since the preforms 2 are rotated during heating.

A heat shield member 360 is supported by a slider 361 disposed around the rotation shaft 331. When the slider 361 is moved upward by a cam (not illustrated in the drawings), the heat shield member 360 surrounds the neck 2A of the preform 2 to shield the neck 2A from heat.

As illustrated in FIG. 5, ring-like members 334 of two transfer members 330 adjacent to each other in the transfer direction come in contact with each other. The ring-like member 334 is supported by the rotation shaft 331 via a rotation bearing 335. The ring-like member 334 has a circular outer circumferential shape, for example. The adjacent ring-like members 334 can come in rolling contact with each other. Therefore, the adjacent ring-like members 334 can maintain the rolling contact relationship even when transferred along a curved transfer path.

As illustrated in FIG. 5, 2n or 3n (e.g., 2n=8) transfer members 330 that are consecutive in the transfer direction may be connected by a connection member 371 to form a single heating transfer jig 370. The connection member 371 includes an inner link 372 that connects one rotation shaft 331 with another rotation shaft 331 adjacent thereto on the upstream side, and an outer link 373 that connects one rotation shaft 331 with another rotation shaft 331 adjacent thereto on the downstream side, for example. The connection member 371 that is formed by connecting the inner link 372 and the outer link 373 forms a chain, and the chain (connection member) 371 engages the plurality of sprockets 321 to 328 illustrated in FIG. 3. Specifically, the connection member 371 that connects the 2n or 3n transfer members 330 is used as a chain instead of using an endless chain.

When connecting the 2n transfer members 330 to form the heating transfer jig 370 (see FIG. 5), for example, it is necessary to provide the heating transfer jig 370 corresponding to the number 2n of preforms that are simultaneously subjected to blow molding when the number 2n is changed. On the other hand, it is easy to deal with a change in the number 2n of preforms simultaneously subjected to blow molding when using the transfer members 330 that are not connected. When using the transfer members 330 that are not connected, it is necessary to provide each transfer member 330 with a member that corresponds to the chain that engages the continuous/intermittent drive members (e.g., sprockets 231 to 238). This also applies to the case where 3n transfer members are used.

The sprockets 321, 323, and 324 among the plurality of sprockets 321 to 328 disposed in the transfer path 300 may be continuous drive sprockets, the sprockets 325 and 327 among the plurality of sprockets 321 to 328 may be intermittent drive sprockets, and the sprockets 322, 326, and 328 among the plurality of sprockets 321 to 328 may be driven sprockets, for example. A continuous drive source drives the sprocket 324, and the driving force is transmitted to the continuous drive sprockets 321 and 323 via belts 328A and 328B, for example. An intermittent drive source drives the sprocket 325, and the driving force is transmitted to the intermittent drive sprocket 327 via a belt 329, for example. Specifically, an upstream path 320 of the transfer path 300 is a continuous drive path, and the downstream path 312 is an intermittent drive path (i.e., the loop-like transfer path 300 includes a continuous drive path and an intermittent drive path in combination).

A parallel driver device 380 that drives (m+1) or more (e.g., four) heating transfer jigs 370 in parallel is disposed under the cooling section 20 illustrated in FIG. 4. As illustrated in FIG. 4, the parallel driver device 380 is formed by attaching the ends of a plurality of transfer rails 384 to two chains 383 that are fitted around sprockets 381 and 382 that are disposed on each end of each shaft. The transfer jig 370 that is guided by the driven sprocket 328 illustrated in FIG. 3 is slid into each transfer rail 384 in the longitudinal direction, and the ring-like members 334 (e.g., eight ring-like members 334) of the heating transfer jig 370 are placed on and supported by the transfer rail 384.

One of the sprockets 381 and 382 is then rotated by one step to transfer the transfer rail 384 by one step. The above operation is repeated to always dispose four heating transfer jigs 370 on the parallel driver device 380. As illustrated in FIG. 4, the preforms 2 are transferred from the cooling section 20 (inversion section 200) to m (m is an integer equal to 2N/2n or 2N/3n (e.g., m=3)) downstream-side heating transfer jigs 370.

As illustrated in FIG. 3, the heating transfer jigs 370 in the first row among the four rows disposed on the parallel driver device 380 is pushed out in the arrow direction C by a discharge device (not illustrated in the drawings) implemented by an air cylinder or the like. Therefore, the transfer members 330 (e.g., eight transfer members 330) (heating transfer jigs 370) that hold the preform 2 sequentially engage the continuous drive sprocket 321, and are sequentially (continuously) transferred.

In FIG. 3, the position of the forefront transfer member 330 (preform 2) (heating transfer jig 370) is marked for convenience of explanation. The forefront transfer member 330 (heating transfer jig 370) in the first row in FIG. 3 is transferred by the discharge device, and engages the continuous drive sprocket 321 on the most upstream side. A continuous transfer force is then applied to the heating transfer jig 370 from the continuous drive sprocket 321.

When the driving force is applied to each heating transfer jig 370 (transfer member 330) that engages the continuous drive sprockets 321, 323, and 324 present in the continuous transfer path 310, another heating transfer jig 370 (transfer member 330) that is positioned on the upstream side and does not engage the continuous drive sprocket is pressed, and a plurality of heating transfer jigs 370 are continuously transferred along the continuous transfer path 310.

A schematic transfer motion of the preforms 2 in the injection molding step, the cooling step, and the heating step is described below with reference to FIG. 6. In FIG. 9, reference signs I1 to I8 indicate intermittent transfer, and reference signs C1 to C3 indicate continuous transfer.

The 2N preforms 2 that have been produced by injection molding in the injection molding section 10 are removed from the pots 122 after the pots 122 have been intermittently transferred by the removal device 120 in the direction indicated by I1. The preforms 2 are transferred to the cooling section 20 via the preform transfer device 50, inverted in the cooling section 20 in the direction indicated by I2, and mounted on three heating transfer jigs 370 disposed on the parallel driver device 380 in units of 2n or 3n preforms.

The forefront heating transfer jig 370 disposed on the parallel driver device 380 is intermittently transferred by the discharge device (not illustrated in FIG. 6) in the direction indicated by I3, and transferred to the continuous transfer path 310. A plurality of heating transfer jigs 370 are continuously transferred along the continuous transfer path 310 due to the driving force applied by the continuous drive sprockets 321, 323, and 324, and contact between the adjacent heating transfer members 370 via the ring-like members 334. The preforms 2 are heated by the heating section 30 while rotating.

In FIG. 3, the intermittent transfer path 312 on the downstream side of the transfer path 300 is in a state immediately after completion of intermittent transfer. A blank area that corresponds to the length of one heating transfer jig 370 is present on the upstream side of the heating transfer jig 370 that engages the continuous drive sprocket 324. Specifically, a plurality of heating transfer jigs 370 positioned on the upstream side of the heating transfer jig 370 that engages the continuous drive sprocket 324 are intermittently transferred at a speed higher than that during continuous transfer due to intermittent drive of the intermittent drive sprockets 325 and 327 (see the arrow indicated by I4 in FIG. 6).

The continuous drive sprocket 324 is continuously driven from the state illustrated in FIG. 3, and the heating transfer jigs 370 that engage the continuous drive sprocket 324 are continuously transferred. In this case, the intermittent drive sprocket 325 engages the heating transfer jigs 370, and rotates dependently. The intermittent drive sprocket 325 then comes in contact with the upstream-side heating transfer jig 370 that has intermittently stopped in the intermittent transfer path 312 via the ring-like member 334, and intermittent transfer is performed at this timing. Therefore, a blank area that corresponds to the length of one heating transfer jig 370 is present again on the upstream side of the heating transfer jig 370 that engages the continuous drive sprocket 324. The above operation is repeated thereafter. The heating transfer jig 370 is sequentially transferred to the transfer rail 384 of the parallel driver device 380 (see FIG. 4) each time intermittent drive is performed (see the arrow indicated by I5 in FIG. 6). The heating transfer jigs 370 that hold 2n or 3n new preforms 2 are intermittently supplied to the continuous transfer path 310 in synchronization with the above operation (see the arrow indicated by I3 in FIG. 6).

2.5. Blow Molding Section

The blow molding section 40 subjects 2n or 3n preforms to biaxial stretching by blowing air and vertically driving a stretching rod to obtain containers. A blow cavity mold, a blow core mold, and an optional bottom mold (not illustrated in the drawings) are clamped. The structure of each mold is well-known in the art, and description thereof is omitted. An intermittent transfer mechanism 400 is provided to transfer 2n or 3n preforms 2 from the heating section 30 to the blow molding section 40. The intermittent transfer mechanism 400 includes a pair of neck holding plates 401 and 402, for example. In FIG. 3, the neck holding plates 401 and 402 are illustrated at a position before or after the movement. The preforms 2 are transferred in a state in which the neck 2A is held by the neck holding plates 401 and 402.

In one embodiment of the invention, the preforms 2 are subjected to blow molding in the blow molding section 40 in the upright state, and transferred by the neck holding plates 401 and 402 in the upright state. The neck holding plates 401 and 402 are also used when removing the 2n containers obtained by blow molding using an ejection section 60.

2n or 3n transfer arms (not illustrated in the drawings) are used to transfer 2n or 3n preforms 2 from the heating section 30 to the blow molding section 40. As illustrated in FIG. 4, 2n or 3n preforms 2 are removed in the inverted state from the heating transfer jigs 370 that have been intermittently transferred on the downstream side of the transfer path 300 in the direction D, and inverted to the upright state in the direction F using the transfer arms (see the arrow indicated by I6 in FIG. 6).

The transfer arm also has a function of changing the arrangement pitch from the narrow pitch during heating to the wide pitch during blow molding (see FIG. 4). A state in which eight (2n=8) preforms having a small diameter and a small length are inverted and changed in pitch, and a state in which four (n=4) preforms having a large diameter and a large length are inverted and changed in pitch, are drawn in FIG. 4 for reference (see the area around the arrows indicated by D and F).

Figure 6:
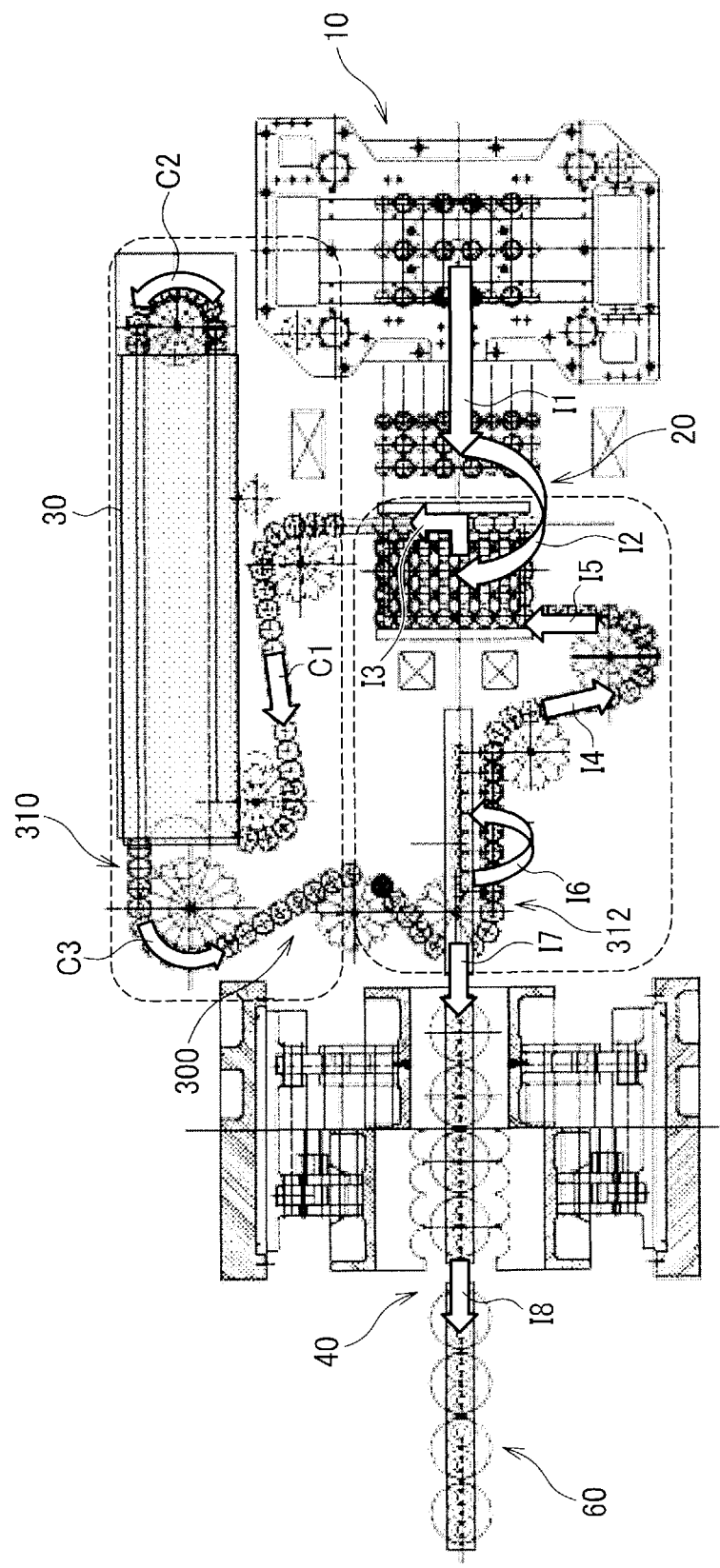
FIG. 6 is a view illustrating intermittent transfer and continuous transfer implemented by a blow molding device.

The preforms 2 are then transferred from the transfer arms to the neck holding plates 401 and 402, and transferred to the blow molding section 40 (see the arrow indicated by I7 in FIG. 6). Note that the operation (indicated by I7 in FIG. 6) that transfers the preforms 2 to the blow molding section 40, and the operation (indicated by I8 in FIG. 6) that transfers the containers obtained by blow molding to the ejection section 60, may be performed at the same time using the neck holding plates 401 and 402.

3. Changes Made when Molding Container with Handle 3.1. Handle Supply Section that Inserts Handle As illustrated in FIG. 3, a handle supply section 630 is provided on the downstream side of the heating section 30.

The handle supply section 630 inserts the handle 500 into the heating transfer jig 370 that engages the drive sprocket 324 and has high positional accuracy at a handle supply position 600. For example, the handle supply section 630 is configured so that the handles 500 are transferred along a chute 620 in a single row or a plurality of rows due to the rotation of an unscrambler 610 and the gravity of the handle 500, and the handle 500 held by an inversion supply section (not illustrated in FIG. 3) in an inverted state is supplied to the heating transfer jig 370 situated at the handle supply position 600. When producing a container with a handle, N (=3 (rows)×4=12) preforms 2 are simultaneously molded (see above). When simultaneously producing 2N (=24) preforms 2 by injection molding, 2n (=8) preforms 2 are mounted on the heating transfer jigs 370 (see FIG. 5). When simultaneously producing N (=12) preforms 2 by injection molding, n (=4) preforms 2 are mounted on the heating transfer jigs 370 (see FIG. 7). The four preforms 2 are mounted on every other transfer member 330 among the eight transfer members 330 that form the heating transfer jigs 370. Therefore, four preforms 2 are mounted on one heating transfer jig 370, and heated in the heating section 30.

Figure 7:
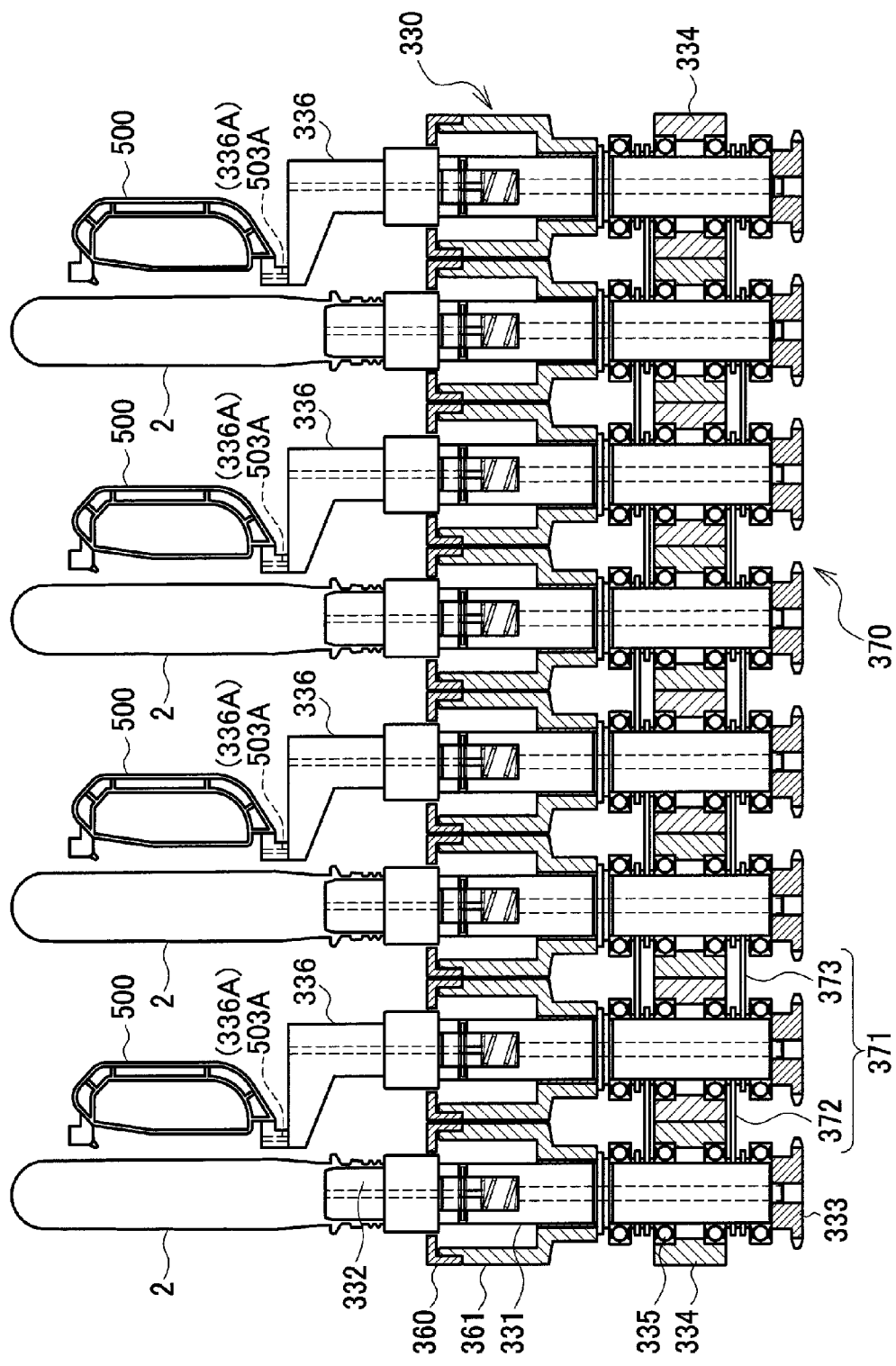
FIG. 7 is a view illustrating a state in which preforms and handles for molding a container with a handle are mounted on a heating transfer jig.

As illustrated in FIG. 7, four transfer members 330 among the eight transfer members 330 on which the preform 2 is not mounted are configured so that the holding section (first holding section) 332 that holds the preform 2 is replaced with a holding section (second holding section) 336 that holds the handle 500 such that the handle 500 can be mounted instead of the preform 2. The holding section 336 includes a square pin 336A that is inserted into a square hole 503A (see FIG. 1) formed in the upper end securing section 503 of the handle 500, for example.

The handle supply section 630 inserts the handle 500 into the heating transfer jig 370 that engages the drive sprocket 324 so that the square pin 336A of the holding section 336 is inserted into the square hole 503A of the upper end securing section 503 of the handle 500. The handle 500 is mounted on the heating transfer jig 370 while being arranged in one direction as a result of inserting the square pin 336A into the square hole 503A.

The neck 2A of the preform can also be uniformly arranged when the handle 500 is mounted on the heating transfer jig 370 while being arranged in one direction.

According to one embodiment of the invention, the relative positional relationship between the preform 2 and the handle 500 held by the heating transfer jigs 370 is thus made identical with the positional relationship during blow molding illustrated in FIG. 1. Note that whether the preform 2 and the handle 500 are in the upright state or the inverted state is not a difference in relative positional relationship. Therefore, a mechanism for changing the relative positional relationship between the preform 2 and the handle 500 is not required in the subsequent step. When the relative positional relationship between the preform 2 and the handle 500 is maintained, the position of the parting line that occurs due to the blow cavity molds 410 and 411 during blow molding can be made uniform, and a process that improves the moldability of the container with a handle can be facilitated. Note that the handle 500 may be held by the heating transfer jig 370 in an arbitrary configuration other than the configuration illustrated in FIG. 7.

According to one embodiment of the invention, after completion of the heating step that heats the preforms 2 in the heating section 30, four handles 500 are supplied to and held by the heating transfer jigs 370 respectively between two preforms 2 that are adjacent to each other in the transfer direction as described above. This makes it possible to transfer the preforms 2 and the handles 500 together without unnecessarily heating the handles 500. Note that the handle supply section 630 may insert four handles 500 at the same time, or may insert one or a plurality of handles 500 at a time. The handle 500 may be supplied to the heating transfer jig 370 at the intermittent stop position along the transfer path 300.

3.2. Transfer from Heating Section to Blow Molding Section

In one embodiment of the invention, the preform 2 and the handle 500 may be transferred from the heating transfer jig 370 to the carry-in jig 420 (see FIG. 1) at the same time. In this case, the intermittent transfer mechanism 400 illustrated in FIG. 3 utilizes the carry-in jig 420 (see FIG. 1) that transfers the preform 2 and the handle 500, and the carry-out jig (not illustrated in the drawings) that transfers the container with a handle instead of the neck holding plates 401 and 402.

In one embodiment of the invention, the heating transfer jigs 370 transfer the preforms 2 and the handles 500 in the inverted state (see FIG. 7), and the carry-in jig 420 transfers the preforms 2 and the handles 500 in the upright state (see FIG. 1). As illustrated in FIG. 4, before transferring the preforms 2 and the handles 500 from the heating transfer jigs 370 to the carry-in jig 420, four handles 500 (not illustrated in FIG. 4) are removed from the heating transfer jigs 370 intermittently transferred on the downstream side of the transfer path 300 in the direction D together with four preforms 2 in the inverted state, and the preforms 2 and the handles 500 are inverted to the upright state in the direction F using the transfer arms (not illustrated in the drawings) (see the arrow indicated by I6 in FIG. 6). The arrangement pitch of the preforms 2 is then changed to the blow molding pitch (wide pitch) while maintaining the arrangement pitch of the preforms 2 and the handles 500 in the upright state. In one embodiment of the invention, the preforms 2 and the handles 500 are transferred to the carry-in jig 420 (see FIG. 1) after changing the arrangement pitch. Note that the carry-in jig 420 may be provided with a pitch conversion mechanism. The pitch conversion mechanism may have a configuration in which the movable section of a pantograph having an X-arm structure that is opened and closed in a vertical plane is displaced using a cam.

3.3. Blow Molding Section that Molds Container with Handle

Figure 8:
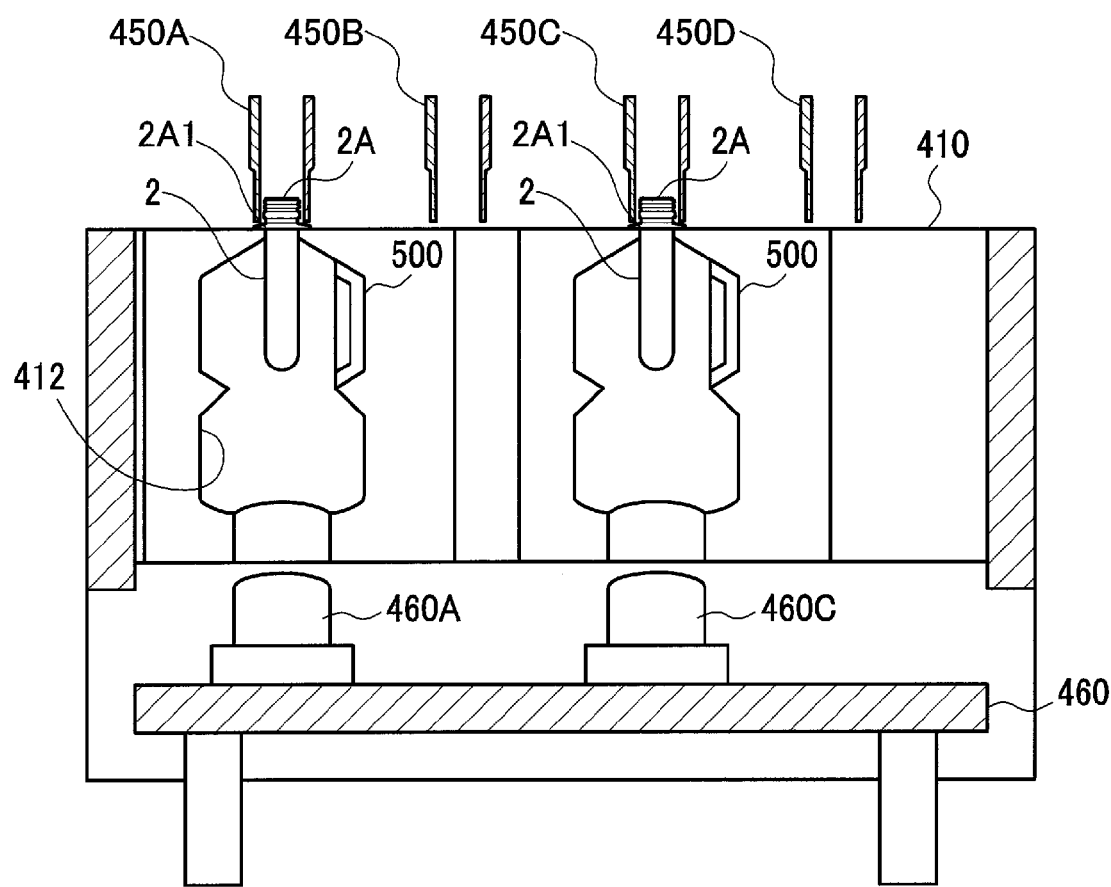
FIG. 8 is a view illustrating a blow molding section that molds a container with a handle.

FIG. 8 schematically illustrates the blow molding section 40 that molds a container with a handle. FIG. 8 illustrates the blow cavity mold 410. In the blow molding device illustrated in FIG. 3, two blow cavity molds 410 each illustrated in FIG. 8 are disposed in parallel so that 2n or 3n containers without a handle, or n containers with a handle can be simultaneously blow-molded. One embodiment of the invention using two blow cavity molds 410 each illustrated in FIG. 8 shows an example in which 2n=8 and n=4.

Each of the blow cavity molds 410 and 411 have n (e.g., n=4) cavities 412 for blow-molding a container with a handle in an area in which 2n cavities for blow-molding 2n (e.g., 2n=8) containers without a handle are provided. Note that FIG. 8 illustrates an example in which one blow cavity mold 410 has n/2 (=2) cavities 412, n containers with a handle are blow-molded using n blow core molds among 2n blow core molds provided to mold 2n containers without a handle using two blow cavity molds 410. In FIG. 8, two blow core molds 450A and 450C among n (n=4) blow core molds 450A to 450D provided corresponding to one blow cavity mold 410 are used.

Since a container with a handle is larger than a container without a handle, the number of preforms simultaneously subjected to blow molding is thus halved to provide a molding space. Therefore, existing equipment can be used without significantly modifying the blow molding section 40.

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of the invention. Any term cited with a different term having a broader meaning or the same meaning at least once in the specification and the drawings can be replaced by the different term in any place in the specification and the drawings.

The above embodiments have been described taking an example in which the invention is applied to a 1-stage (hot parison) or 1.5-stage injection stretch blow molding device in which the injection molding section and the blow molding section are provided on a base. Note that the invention may also be applied to a 2-stage (cold parison) blow molding device in which a stage on which the injection molding section is disposed is separately provided, and only the heating section and the blow molding section are provided on a base.

Although the above embodiments have been described taking an example in which the handle 500 is supplied to the heating transfer jig 370 on the downstream side of the heating section 30, the configuration is not limited thereto. It suffices that at least the handle 500 be held by the carry-in jig 420 (see FIG. 1) between two preforms 2 that are adjacent to each other in the transfer direction, and transferred to the blow molding section 40. Specifically, the handle 500 may be supplied to the carry-in jig 420, or the handle 500 may be supplied to the transfer arm before performing the inversion operation (see F in FIG. 4), for example.

REFERENCE SIGNS LIST

2: preform, 10: injection molding section, 20: cooling section, 30: heating section, 40: blow molding section, 300: transfer path, 310: continuous transfer path, 312: intermittent transfer path, 321 to 328: sprocket, 330: transfer member, 332: first holding section, 336: second holding section, 370: heating transfer jig, 400: intermittent transfer mechanism, 410, 411: blow cavity mold, 420: carry-in jig (blow transfer jig), 450A to 450D: blow core mold, 500: handle, 630: handle supply section.

What is claimed is:

1. A blow molding method for blow-molding a container with a handle that includes disposing a preform and the handle between a pair of blow cavity molds, and blow-molding the preform into the container to integrate the handle with the container, the blow molding method comprising:

heating the preform in a state in which the preform is held by a heating transfer jig; and supplying the handle to the heating transfer jig in an empty state after completion of the heating so that the handle is held by the heating transfer jig, the heating transfer jig holding the handle being situated between two heating transfer jigs that respectively hold two preforms that are adjacent to each other in a transfer direction.

2. The blow molding method as defined in claim 1, further comprising:
transferring the preform and the handle simultaneously from the heating transfer jigs to a blow transfer jig.

3. The blow molding method according to claim 2, further comprising
inverting the preform and the handle before transferring the preform and the handle from the heating transfer jigs to the blow transfer jig,
wherein the heating transfer jigs transfer the preform and the handle in an inverted state, and
wherein the blow transfer jig transfers the preform and the handle in an upright state.

4. A blow molding method for blow-molding a container with a handle that includes disposing a preform and the handle between a pair of blow cavity molds, and blow-molding the preform into the container to integrate the handle with the container, the blow molding method comprising:
heating the preform in a state in which the preform is held by a heating transfer jig; and
supplying the handle to the heating transfer jig in an empty state after completion of the heating so that the handle is held by the heating transfer jig, the heating transfer jig holding the handle being situated between two heating transfer jigs that respectively hold two preforms that are adjacent to each other in a transfer direction,
wherein the pair of blow cavity molds have n (n is a natural number) cavities for blow-molding a container with a handle in an area in which 2n or 3n cavities for blow-molding 2n or 3n containers without a handle are provided, and
wherein n containers with a handle are blow-molded using the n cavities and n blow core molds.

5. The blow molding method according to claim 2,
wherein a relative positional relationship between the preform and the handle held by the heating transfer jigs is identical with a relative positional relationship between the preform and the handle during blow molding.

6. The blow molding method according to claim 1, further comprising:
transferring the preform and the handle held by the blow transfer jigs to a space between the pair of blow cavity molds in an open state;
clamping the pair of blow cavity molds to position the preform and the handle inside the pair of blow cavity molds; and
blow-molding the preform into the container inside the pair of blow cavity molds to integrate the handle with the container.

7. A blow molding device that is configured to dispose a preform and a handle between a pair of blow cavity molds, and blow-mold the preform into a container to integrate the handle with the container, the blow molding device comprising:
a heating section that heats the preform that is transferred while being held by a heating transfer jig; and
a handle supply section that supplies the handle to the heating transfer jig in an empty state after completion of the heating by the heating section so that the handle is held by the heating transfer jig, the heating transfer jig holding the handle being situated between two heating transfer jigs that respectively hold two preforms that are adjacent to each other in a transfer direction.

8. The blow molding device as defined in claim 7,
wherein the heating transfer jig that holds the preform includes a first holding section that holds an open neck of the preform in an inverted state in which the neck is positioned on a lower side,
wherein the heating transfer jig that holds the handle includes a second holding section that holds the handle so that the handle is arranged in one direction, and
wherein the first holding section and the second holding section are removable from the heating transfer jigs.

9. A blow molding method for blow-molding a container with a handle that includes disposing a preform and the handle between a pair of blow cavity molds, and blow-molding the preform into the container to integrate the handle with the container, the blow molding method comprising:
heating the preform in a state in which the preform is held by a heating transfer jig;
supplying the handle to the heating transfer jig in an empty state after completion of the heating so that the handle is held by the heating transfer jig, the heating transfer jig holding the handle being situated between two heating transfer jigs that respectively hold two preforms that are adjacent to each other in a transfer direction; and
transferring the preform and the handle simultaneously from the heating transfer jigs to a blow transfer jig,
wherein the pair of blow cavity molds have n (n is a natural number) cavities for blow-molding a container with a handle in an area in which 2n or 3n cavities for blow-molding 2n or 3n containers without a handle are provided, and
wherein n containers with a handle are blow-molded using the n cavities and n blow core molds.

10. A blow molding method for blow-molding a container with a handle that includes disposing a preform and the handle between a pair of blow cavity molds, and blow-molding the preform into the container to integrate the handle with the container, the blow molding method comprising:
heating the preform in a state in which the preform is held by a heating transfer jig;
supplying the handle to the heating transfer jig in an empty state after completion of the heating so that the handle is held by the heating transfer jig, the heating transfer jig holding the handle being situated between two heating transfer jigs that respectively hold two preforms that are adjacent to each other in a transfer direction;
transferring the preform and the handle simultaneously from the heating transfer jigs to a blow transfer jig;
inverting the preform and the handle before transferring the preform and the handle from the heating transfer jigs to the blow transfer jig,
wherein the heating transfer jigs transfer the preform and the handle in an inverted state, and
wherein the blow transfer jig transfers the preform and the handle in an upright state,
wherein the pair of blow cavity molds have n (n is a natural number) cavities for blow-molding a container with a handle in an area in which 2n or 3n cavities for blow-molding 2n or 3n containers without a handle are provided, and wherein n containers with a handle are blow-molded using the n cavities and n blow core molds.

11. The blow molding method according to claim 3, wherein a relative positional relationship between the preform and the handle held by the heating transfer jigs is identical with a relative positional relationship between the preform and the handle during blow molding.

12. The blow molding method according to claim 2, further comprising:
   transferring the preform and the handle held by the blow transfer jigs to a space between the pair of blow cavity molds in an open state;
   clamping the pair of blow cavity molds to position the preform and the handle inside the pair of blow cavity molds; and
   blow-molding the preform into the container inside the pair of blow cavity molds to integrate the handle with the container.

13. The blow molding method according to claim 3, further comprising:
   transferring the preform and the handle held by the blow transfer jigs to a space between the pair of blow cavity molds in an open state;
   clamping the pair of blow cavity molds to position the preform and the handle inside the pair of blow cavity molds; and
   blow-molding the preform into the container inside the pair of blow cavity molds to integrate the handle with the container.

* * * * *